US007992750B2

(12) United States Patent
Walker (10) Patent No.: US 7,992,750 B2
(45) Date of Patent: Aug. 9, 2011

(54) BICYCLE WHEEL MOUNTING BRACKET

(76) Inventor: Lee Walker, Cary, NC (US)

( * ) Notice: Subject to any disclaimer, the term of this patent is extended or adjusted under 35 U.S.C. 154(b) by 1081 days.

(21) Appl. No.: 11/512,560

(22) Filed: Aug. 30, 2006

(65) Prior Publication Data

US 2008/0054035 A1    Mar. 6, 2008

(51) Int. Cl.
*B60R 9/00* (2006.01)
(52) U.S. Cl. .............. 224/403; 224/42.12; 224/441; 224/450
(58) Field of Classification Search ........... 224/42.12, 224/42.21, 42.24, 403, 441, 443, 448, 450; 211/5, 19, 20, 22–24; 248/227.1–227.4; 410/3, 101, 104

See application file for complete search history.

(56) References Cited

U.S. PATENT DOCUMENTS

| | | | | |
|---|---|---|---|---|
| 2,339,947 A | | 1/1942 | Reaume | |
| 2,742,211 A | * | 4/1956 | Craft, Sr. ............... | 224/200 |
| 3,291,427 A | | 12/1966 | Hutchings ............ | 248/201 |
| 3,792,775 A | * | 2/1974 | Riddle et al. .......... | 211/70.8 |
| 3,828,993 A | | 8/1974 | Carter | |
| 3,972,456 A | * | 8/1976 | Saffold ................. | 224/533 |
| 3,990,618 A | * | 11/1976 | Shattuck .............. | 224/42.24 |
| 4,006,825 A | * | 2/1977 | Austin et al. ......... | 211/70.8 |
| 4,088,253 A | * | 5/1978 | Saffold ................. | 224/536 |
| 5,071,048 A | * | 12/1991 | Price et al. ........... | 224/604 |
| 5,267,657 A | * | 12/1993 | McGuiness et al. ....... | 211/22 |
| 5,588,661 A | | 12/1996 | Wolfe | |
| 5,971,683 A | * | 10/1999 | Hunt ..................... | 410/106 |
| 5,971,684 A | * | 10/1999 | Wang .................... | 410/107 |
| 6,129,490 A | * | 10/2000 | Erskine et al. ......... | 410/110 |
| 2005/0000989 A1 | * | 1/2005 | Gilstrap et al. ....... | 224/420 |
| 2006/0273124 A1 | * | 12/2006 | Bogoslofski ......... | 224/441 |

OTHER PUBLICATIONS http://www.yakima.com/Product.aspx?id=98, HighRoller, 1 page downloaded and printed from the World Wide Web on or about Jan. 23, 2007.
http://www.yakima.com/Product.aspx?id=99, SprocketRocket, 1 page downloaded and printed from the World Wide Web on or about Jan. 23, 2007.

* cited by examiner

*Primary Examiner* — Justin M Larson
*Assistant Examiner* — Adam Waggenspack
(74) *Attorney, Agent, or Firm* — Knobbe, Martens, Olson & Bear, LLP (57) ABSTRACT

A wheel mount for storing and transporting a wheel, such as a spare bicycle wheel, is disclosed. The wheel mount is preferably substantially smaller that the wheel and attaches to an automobile or an automobile-mounted transportation rack. In one embodiment, the wheel mount attaches to a truck bed railing and has a slot for accepting a portion of an axle of a bicycle wheel, the slot restricting at least some movement of the bicycle wheel. In some embodiments, a cam mechanism common to many bicycle wheel axles can be engaged to further restrict movement of the bicycle wheel while it is in the wheel mount.

14 Claims, 11 Drawing Sheets

BICYCLE WHEEL MOUNTING BRACKET

BACKGROUND

1. Field of the Disclosure

The present disclosure relates generally to the field of cycling and athletics and more specifically to the transportation of cycling equipment.

2. Description of the Related Art

Bicycling began mainly as an efficient form of transportation and has since become an ever-growing form of recreation, exercise, and sport. Cyclists often now travel to different locations to find new or enjoyable trails, sporting events, and the like. Thus, it is common to transport bicycles to and from various venues by means of an automobile. Hence, a wide variety of bicycle racks have become commercially available to aid in this transport. Commonly, bicycle racks employ variations of mounting the front fork of the bicycle to a mount, which often includes the removal of the front wheel of the bicycle. In a car, this wheel may be stored in the trunk or anywhere in the car where space permits. In pickup trucks, there is often little cargo room in the cab, and most cargo is often stored in the truck bed. Regardless of the type of vehicle, a loose wheel may lead to damage of the wheel and/or the vehicle.

SUMMARY

In various embodiments, a wheel mount of the present disclosure mounts under the railing of a pickup truck bed advantageously placing it generally out of the way reducing hindrances associated with, for example, cargo loading. A bicycle wheel may then be mounted onto the wheel bracket and preferably be held close to the side of the pickup truck bed. Alternatively, the wheel mount may be removably affixed in a car trunk, the rear of an SUV, minivan or wagon, or attached to a luggage or equipment rack, or the like. A wheel mount according to the present disclosure may also be used to store wheels in a garage, shed, basement, or similar location, such as by affixing the mount to a wall.

An embodiment of the disclosed mounting bracket comprises a single-piece bracket that can mount a bicycle wheel along a side of a pick-up truck bed or other cargo bed. The bracket may be removed, however, in at least an embodiment, the bracket is preferably significantly smaller than the radius of a wheel to provide little or no imposition to the use of the truck bed or storage area when not in use. Embodiments of the disclosed mount may be particularly useful in conjunction with bike racks that require the removal of the front wheel for the bike's transport, may also be used to transport a spare wheel, combinations of the same or the like.

Another aspect of the disclosure is to provide a wheel mount employing security mechanisms. In an embodiment, the wheel mount is attached to a truck or cargo bed rail with the attachment mechanism partially or fully hidden from view. For example, the attachment mechanism may comprise a bolt, a quick-release lever, or other fastening mechanisms that tighten to the interior of a cargo bed rail lip. This and other locations make it more difficult for someone to quickly determine how to remove the wheel mount. In some embodiments, even when someone determines how to remove the bracket, the location of the attachment mechanism may also make it more difficult to quickly remove without the use of tools and/or without drawing attention to the activity.

For purposes of summarizing this disclosure, certain aspects, advantages and novel features of the disclosure have been described herein. Of course, it is to be understood that not necessarily all such aspects, advantages or features will be embodied in any particular embodiment of the disclosure.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit its scope. Throughout the drawings, reference numbers are reused to indicate correspondence between referenced elements.

FIG. 4b illustrates an enlarged side planar view of an embodiment of the wheel mounting bracket as shown in FIG. 4a.

FIG. 7b illustrates a rear perspective view of an embodiment of the wheel mounting bracket as pictured in FIG. 7a.

DETAILED DESCRIPTION

Various embodiments and examples of the wheel mounting bracket will now be described with reference to the drawings. For purposes of illustration, some embodiments will be described in the context of vehicles with cargo beds, such as, for example, trucks, SUVs, cars, vans, and the like. However, the disclosure is not limited thereby. Brackets made according to the teachings herein may also be utilized in any number of locations, including other vehicles, storage areas such as garages, sheds, lockers, or any place or situation where total or partial immobilization of a wheel is desired. Moreover, the specific implementations described herein are set forth in order to illustrate, not to limit, the disclosure. The scope of this disclosure is defined at least in part by the appended claims.

Figure 1:
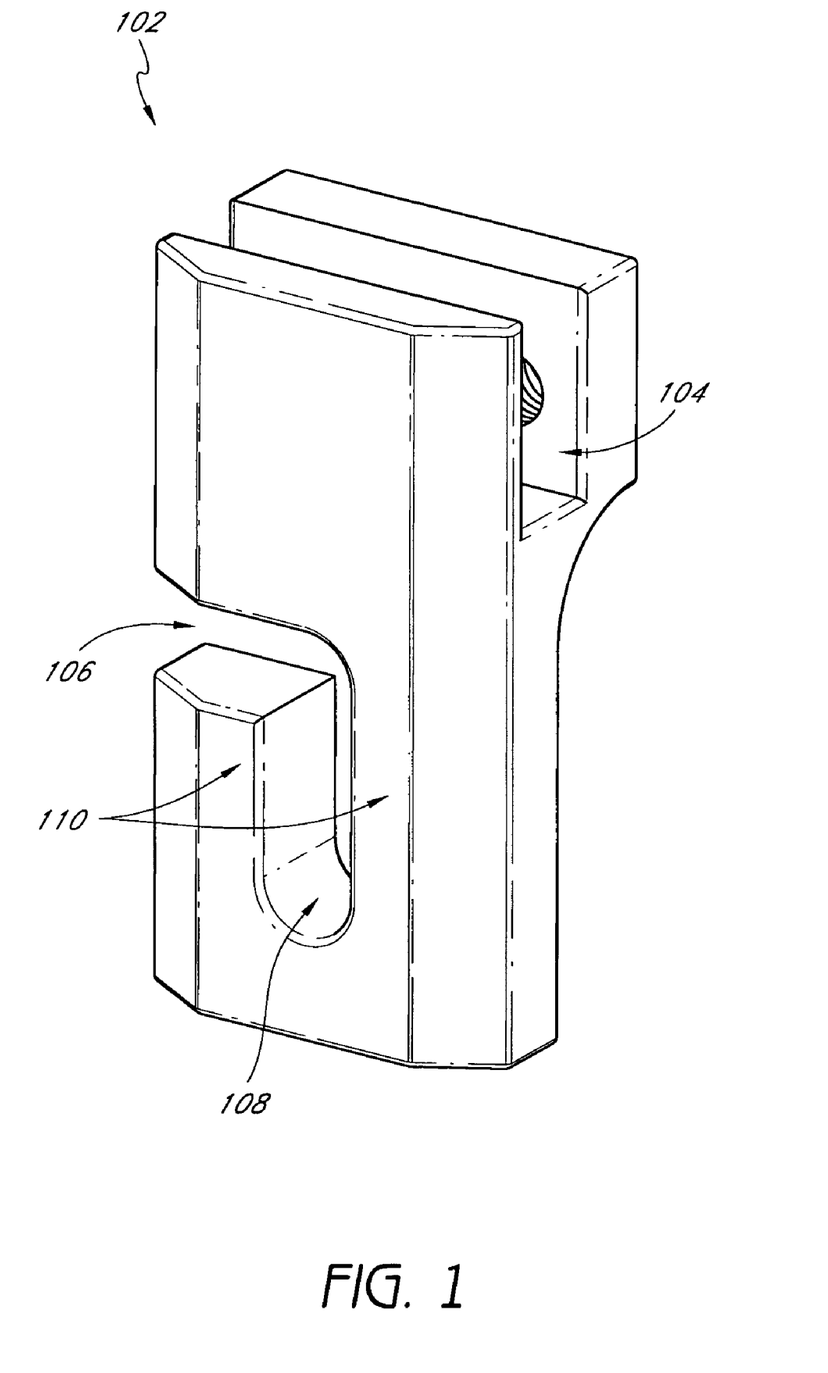
FIG. 1 illustrates a perspective front view of an embodiment of a wheel mounting bracket according to the present disclosure.

An embodiment of the mounting bracket of the present disclosure is preferably a unitary piece of material comprising structure adapted for mounting to the railing of a cargo bed and a slot or channel for accepting the axle or other portion of a bicycle or other similar wheel. As shown in FIG. 1, an embodiment of a wheel mounting bracket 102 comprises a unitary structure, preferably comprising lightweight material, such as an aluminum alloy. Such an alloy may advantageously resist corrosion and rusting, when subjected to rain, snow, other harsh weather, and the like. Other metals, metal alloys—such as stainless steel, composites, rigid plastics, rubbers, wood, and combinations of the same or the like, may also be used. Bracket 102 may preferably comprise an attachment member having a mounting channel 104, running along the upper portion of the bracket. Mounting channel 104 can be utilized to secure the mounting bracket 102 to a cargo bed railing, or other mounting location.

FIG. 1 also shows embodiments of bracket 102 comprising an axle-accepting channel 106. In an embodiment, the axle-accepting channel 106 comprises a generally downward-pointing L-shape that allows the axle of a bicycle wheel to slide horizontally into the channel and then downwardly to a wheel resting point 108. The shape of axle-accepting channel 106, as shown in FIG. 1, is preferable, because it allows an axle to be easily slid into the channel 106 to the resting point 108, where gravity can aide in keeping the wheel in place in the mount. Moreover, the downward portion substantially restricts the axle from lateral movement. An artisan will recognize from disclosure herein many other shapes for the axle-accepting channel 106 and optional resting point 108.

Wheel mounting bracket 102 also comprises clamping surfaces 110 that form at least a portion of axle-accepting channel 106 and/or resting point 108. These surfaces may be utilized to further secure a bicycle wheel having a camming mechanism, as is typical on many modern bicycles, by engaging the camming mechanism of the wheel once the axle rests inside the axle-accepting channel 106. The camming mechanism may be engaged similarly to attaching the wheel to a bicycle fork.

Figure 2:
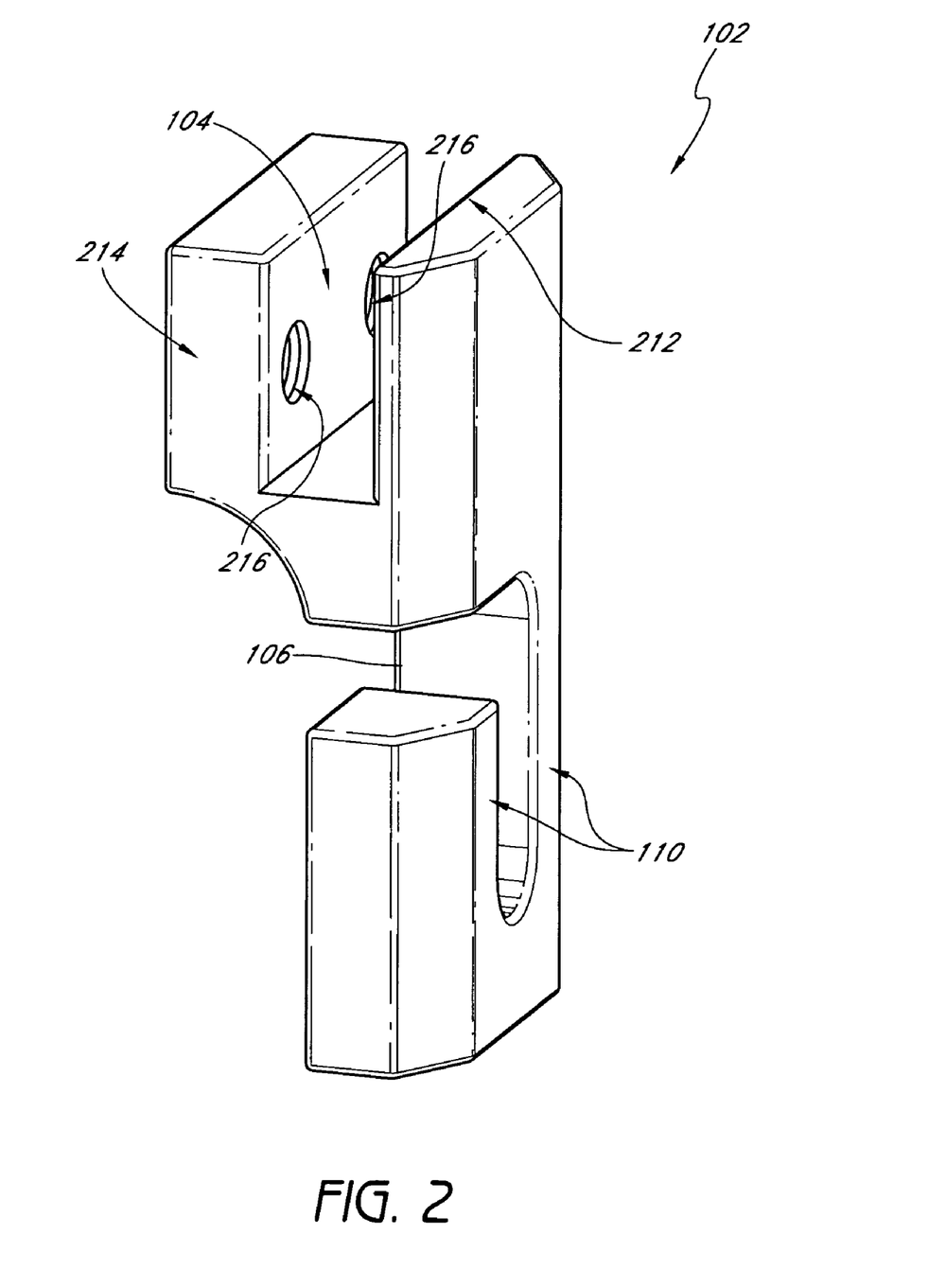
FIG. 2 illustrates a perspective side view of an embodiment of a wheel mounting bracket of the present disclosure.

FIG. 2 illustrates a side perspective view of an embodiment of wheel mounting bracket 102. As shown in FIG. 2, mounting channel 104 of an attachment member comprises a generally "U"-shaped channel extending perpendicular from the axle-accepting channel 106, separating a front fork 212 from a rear fork 214. In some embodiments, one or more mounting holes 216 may pass through rear fork 214. The mounting holes 216 may be threaded to accept attachment mechanisms, such as, for example, screws or bolts for fastening the wheel mounting bracket 102 to the lip of a truck bed. In other embodiments, screws or bolts may utilize nuts or end caps to help secure the wheel mounting bracket in place; other attachment mechanisms may include pegs, quick release mechanisms, adhesives, magnets, flexible or mechanical clips, clamps, zip-ties, rotatable fastening mechanisms—such as camming mechanisms, combinations of the same, or the like may also be used.

Figure 3:
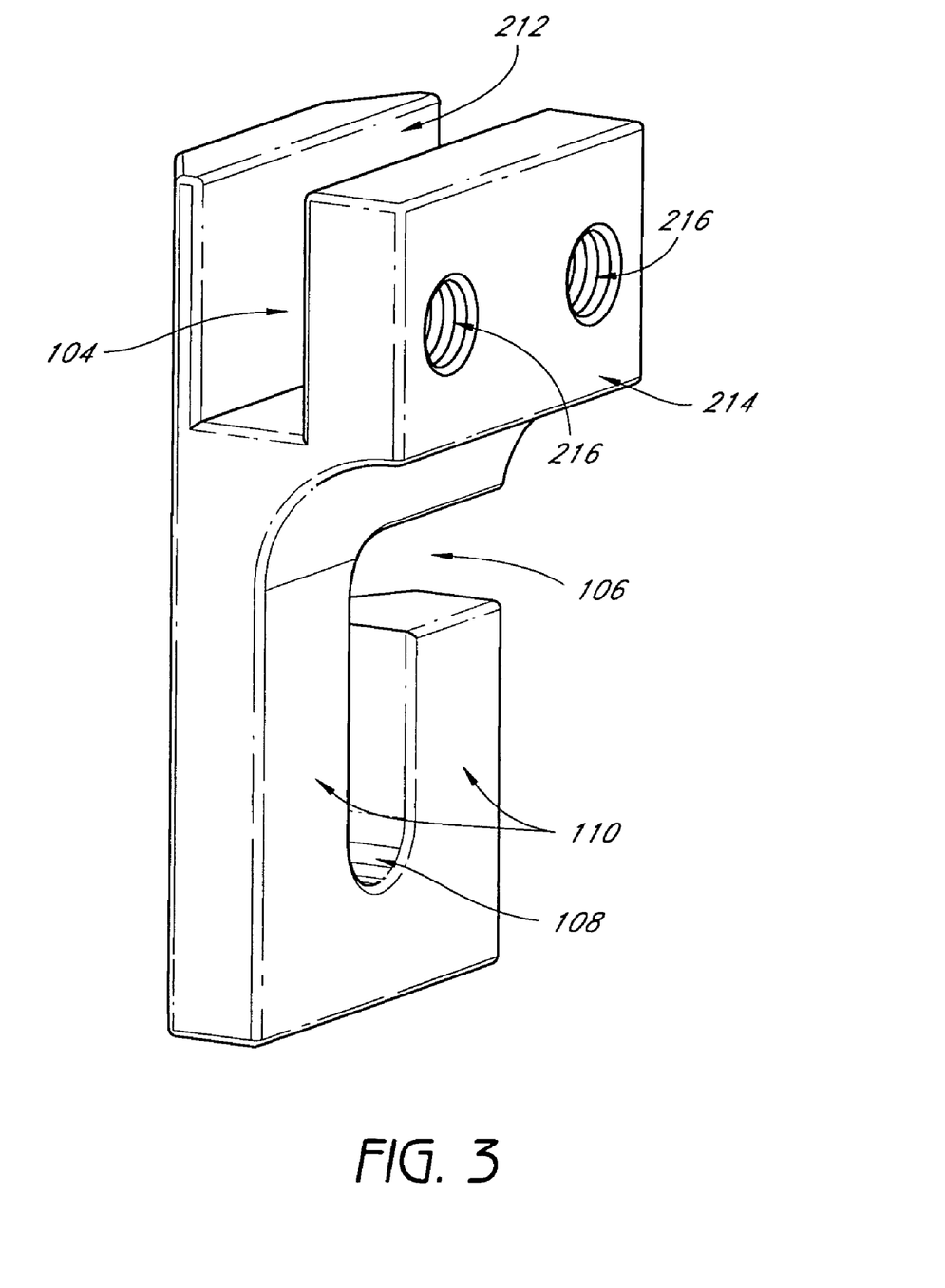
FIG. 3 illustrates a perspective rear view of an embodiment of a wheel mounting bracket according to the present disclosure.

FIG. 3 illustrates the mounting holes 216 as well as a concave inner shape advantageously positioning the axle-accepting channel 106 in a convenient location for ventilation with respect to the cargo bed. A shape, such as illustrated in FIG. 3, helps allow an axle end cap to fit between the mounting bracket 102 and the cargo bed. It may also aid in providing access to the attachment mechanism, in some embodiments.

Figure 4A:
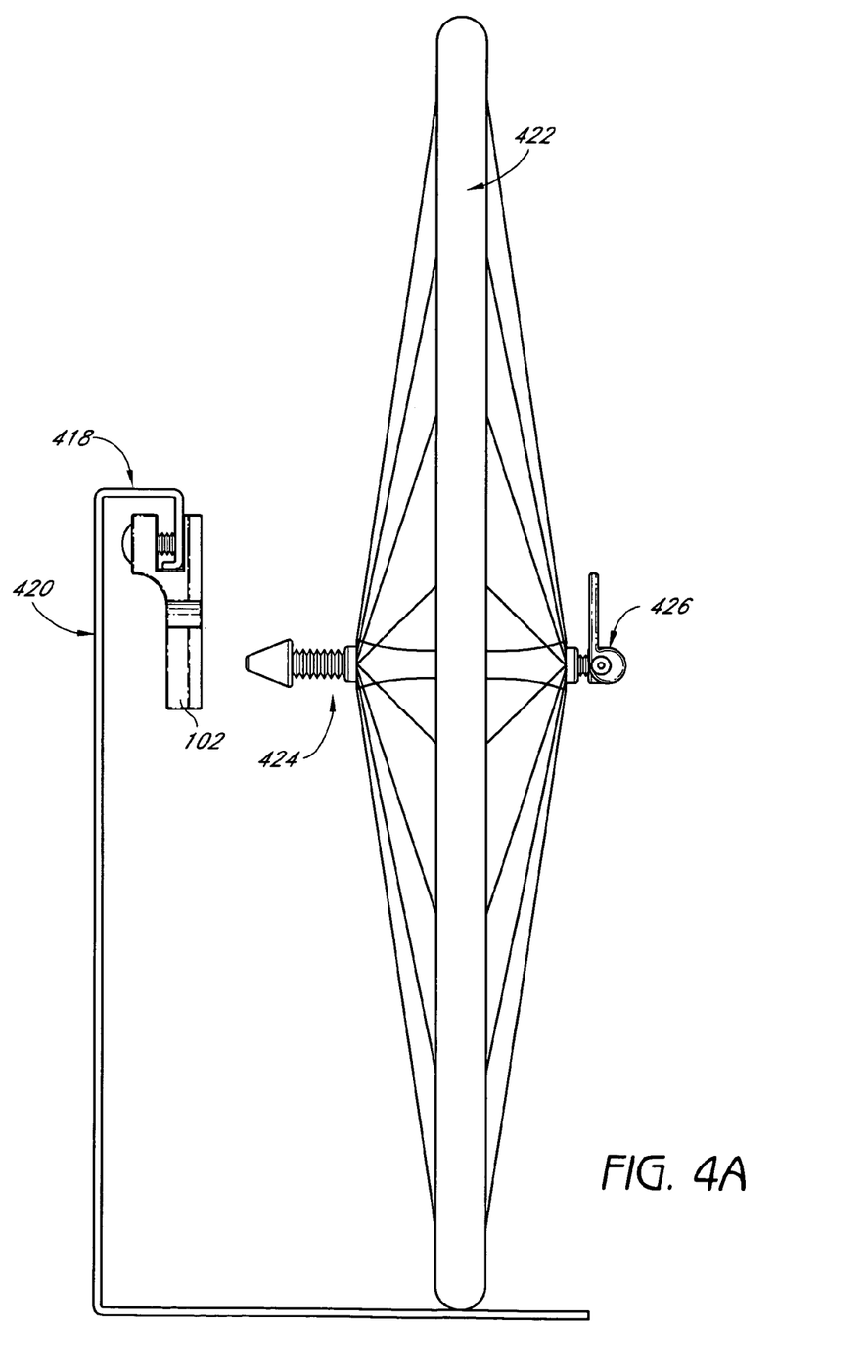
FIG. 4a illustrates a side planar view of an embodiment of a wheel mounting bracket as mounted to a vehicle bed.
Figure 4B:
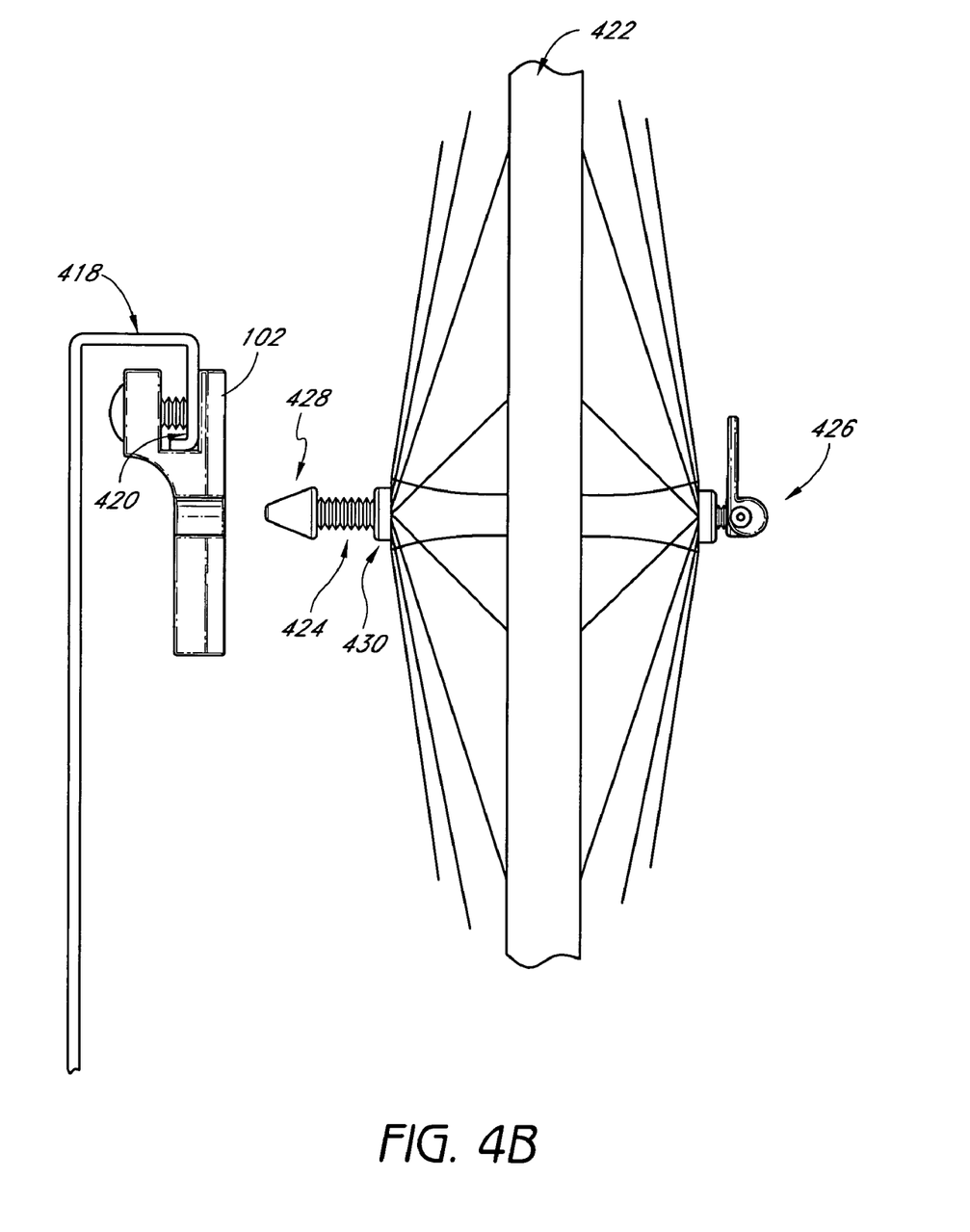

For example, FIG. 4*a* illustrates an embodiment of the wheel mounting bracket 102 attached to a cargo bed railing 418 (FIG. 4*b* shows an enlarged view of 4*a*). One place to mount wheel mounting bracket 102 is to the railing of a cargo bed 418, specifically to a lip 420 that is common to many beds. As is shown, in one embodiment, the securing channel 104 of wheel mounting bracket 102 surrounds a portion of the lip 420 of the railing 418. In one embodiment, an attachment mechanism comprises bolts which may be placed through mounting holes 216 and may be tightened against lip 420 to create a friction or other fit, thereby supporting the mounting bracket 102 and preferably generally fixing it in place. Advantageously, such a friction fit avoids damaging the railing 418, the lip 420, or any liner that may be present in the cargo bed. In one embodiment, positioning the bolts or other securing means between the lip 420 and the railing 418 is desirable to reduce any potential scratching or damage to the external lip 420 and/or to help maintain a cleaner and less obtrusive external profile for the mounting bracket 102. This configuration also provides a security advantage—by placing a portion of an attachment member or mechanism behind the lip, the workings of the attachment become less obvious and less easily accessed, effectively deterring theft by making removal seem to be and/or actually be more difficult. Of course, in other embodiments, mounting holes 216 may be placed through the external surface. Screws or bolts may also be driven through a truck bed lip 420 to help secure the mounting bracket 102 in place in a less preferred embodiment. Also, cam releasing or quick release mechanisms may make removal very straightforward.

FIGS. 4*a* and 4*b* also show a bicycle wheel 422 having an axle 424 through a hub 430 and a camming lever 426. The axle 424 includes an end cap 428 opposite the camming lever 426. As is understood by an artisan, wheels with camming lever 426 allows for a generally quick release of the wheel from a bicycle fork. Releasing the camming lever 426 lengthens the axle 424 to allow separation from a fork; tightening the camming lever 426 shortens the axle, pinching the wheel in place on the fork between the end cap 428 and an end of the camming lever 426. The camming motion of the wheel axle 424 can be used to help hold the wheel 422 in place on the wheel mounting bracket 102. The axle 424 may be slid into axle-accepting channel 106—with end cap 428 on one side of the clamping surfaces 110 and the hub 430 on the other side of clamping surfaces 110—and placed at resting point 108. In one embodiment, a wheel 422 may be transported in this position (particularly for wheels without the camming mechanism). In an embodiment when the wheel 422 does have a camming mechanism, however; once the axle 424 is at the resting point 108 of the bracket 102, tightening the camming lever 426 shortens the axle 424 and forms a friction fit that pinches the wheel 422 into a substantially fixed position with respect to the wheel mounting bracket 102. (See FIG. 5 for positioning the wheel 422's axle 424 into axle-accepting channel 106 and FIG. 6 for the wheel 422 held in wheel mounting bracket 102 at resting point 108 by the camming mechanism).

Figure 5:
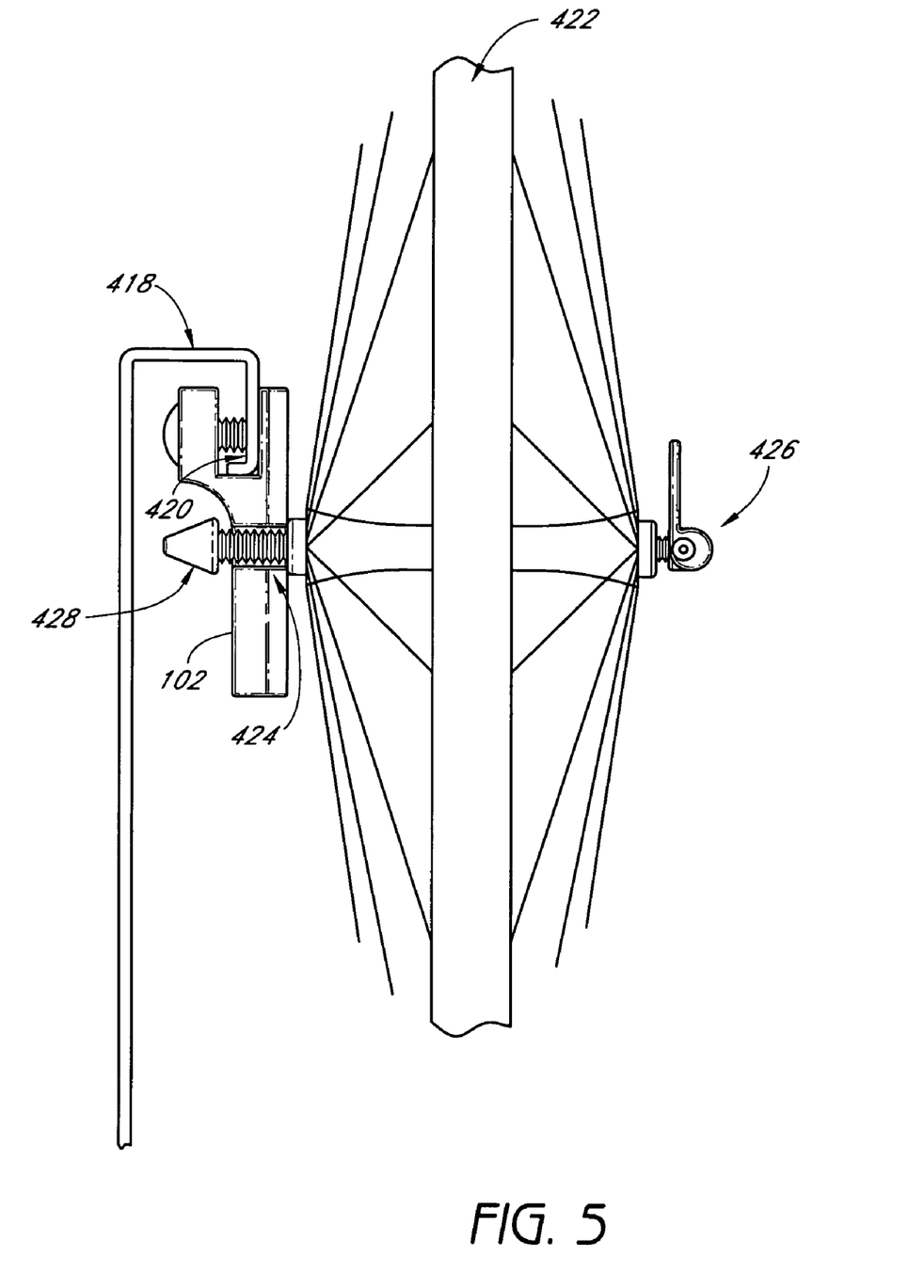
FIG. 5 illustrates a side planar view of an embodiment of the wheel mounting bracket with a wheel axle slid into an axle holding channel of the wheel mounting bracket.
Figure 6:
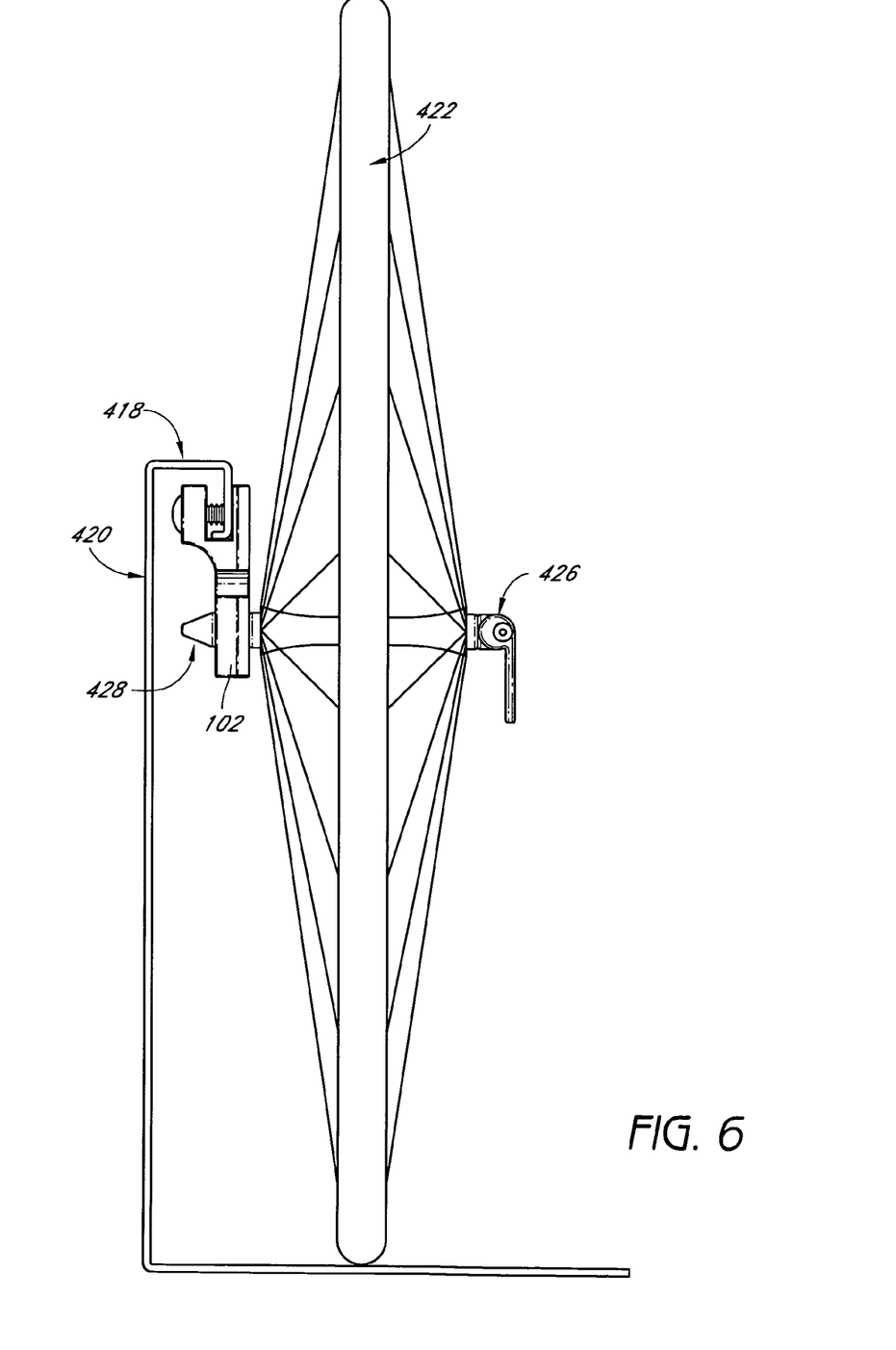
FIG. 6 illustrates a side planar view of an embodiment of the wheel mounting bracket with a wheel in a locked position.

FIG. 5 and FIG. 6 further illustrate removably fixing the axle 424 with respect to the bracket 102, including the axle sliding down into a laterally locked position shown in FIG. 6. Note that in FIG. 6 a wheel may be laterally locked without necessarily activating the cam 426.

The wheel mounting bracket 102 as discussed herein may comprise relatively small dimensions, advantageously being minimally obtrusive to loading, unloading, or carrying other cargo when a wheel is not mounted. An artisan will recognize a wide number of configurations, possibly adapted to the mounting structure and wheel to be mounted. Moreover, the artisan will recognize a wide number of sizes of a bracket 102. Various embodiments of a bracket according to the present disclosure may preferably be sized between just larger than the axle-accepting channel and about the size of the radius of a wheel to be mounted.

By way of example, an embodiment of bracket 102 may comprise a solid piece of aluminum alloy about three (3.0) inches in height, about one and one half (1.5) inches in width, and about one (1.0) inch in depth (where height and width are ascertainable in FIG. 1—the mounting channel 104 runs the width; height measures the orientation from the mounting channel 104 to below resting point 108—and height and depth are ascertainable in FIG. 2). A person of ordinary skill in the art will be able to machine a part according to the disclosed specifications from such a piece. The mounting channel 104 is sized to fit substantially around a mounting location, such as a portion of a cargo rail 418. A preferable range for channel 104 is about one half (0.50) of an inch to about one (1.00) inch in height and about one quarter (0.25) to about four-tenths (0.40) of an inch in depth. In an embodiment, mounting channel is about seventy-five hundredths (0.75) inches in height and about three hundred seventy-five thousandths (0.375) of an inch in depth.

The axle-accepting channel is sized sufficiently in height and width to allow insertion of a bicycle axle. The axle-accepting channel is ideally approximately three hundred seventy-five thousandths (0.375) of an inch in height (along the horizontal portion) and width (along the vertical portion); a range of about three hundred seventy-five thousandths (0.375) of an inch to about one half (0.50) of an inch is preferred. Embodiments of axle-accepting channel are generally workable in a range of about two-tenths (0.20) and about seventy-five hundredths (0.75) of an inch. The depth of the mounting bracket at and around the axle-accepting channel 106 and clamping surfaces 110 preferably is sized to allow an axle to slide along axle-accepting channel 106 with end cap 428 and hub 430 on opposite sides of clamping surfaces 110, when there is no camming mechanism or the camming mechanism is in a loose position. In an embodiment, this depth is ideally approximately one half (0.50) of an inch; it preferably ranges from about forty-five hundredths (0.45) of an inch to about fifty-five hundredths (0.55) of an inch. A workable range includes depths of about thirty-five hundredths (0.35) of an inch to about six tenths (0.60) of an inch.

Other measurements may vary widely, but an example of the bracket 102 comprises a height of about three (3.0) inches, a width of about one and one half (1.5) inches (see FIG. 1). Approximately one and three hundred seventy-five thousandths (1.375) inches from the top, axle-accepting channel 106 begins on one side and is about three hundred seventy-five thousandths (0.375) of an inch in height. The axle-accepting channel 106 runs horizontally until it reaches the middle of the wheel mount (the center point being approximately seventy-five hundredths (0.75) of an inch). The axle-accepting channel of the present example reorients approximately 90 degrees and extends vertically about one and one hundred twenty-five thousandths (1.125) inches in height toward the bottom of the wheel mount, ending at resting point 108. As seen in FIG. 2, the lower approximately two (2.0) inches is about one half (0.5) inch in depth. Mounting channel 104 is about three hundred seventy-five thousandths (0.375) of an inch in depth and approximately seventy-five hundredths (0.75) of an inch in height and spans the entire width of the wheel mount. The full depth of the upper portion, including front piece 212, mounting channel 104 and rear mount 214 is about one (1.0) inch. In a preferred embodiment, at least the front left and right edges may be beveled to reduce sharp edges that could otherwise catch, tear, or damage wheels being mounted or dismounted and/or other cargo placed near an empty wheel mount.

As recognizable to an artisan from the disclosure herein, there are a number of alternative configurations that may be utilized in carrying out the foregoing or other embodiments of the present disclosure. For example, the axle-accepting channel 106 may be beveled to allow an axle to more easily slide or roll along the channel. A few alternate configurations will also be discussed below.

Figure 7A:
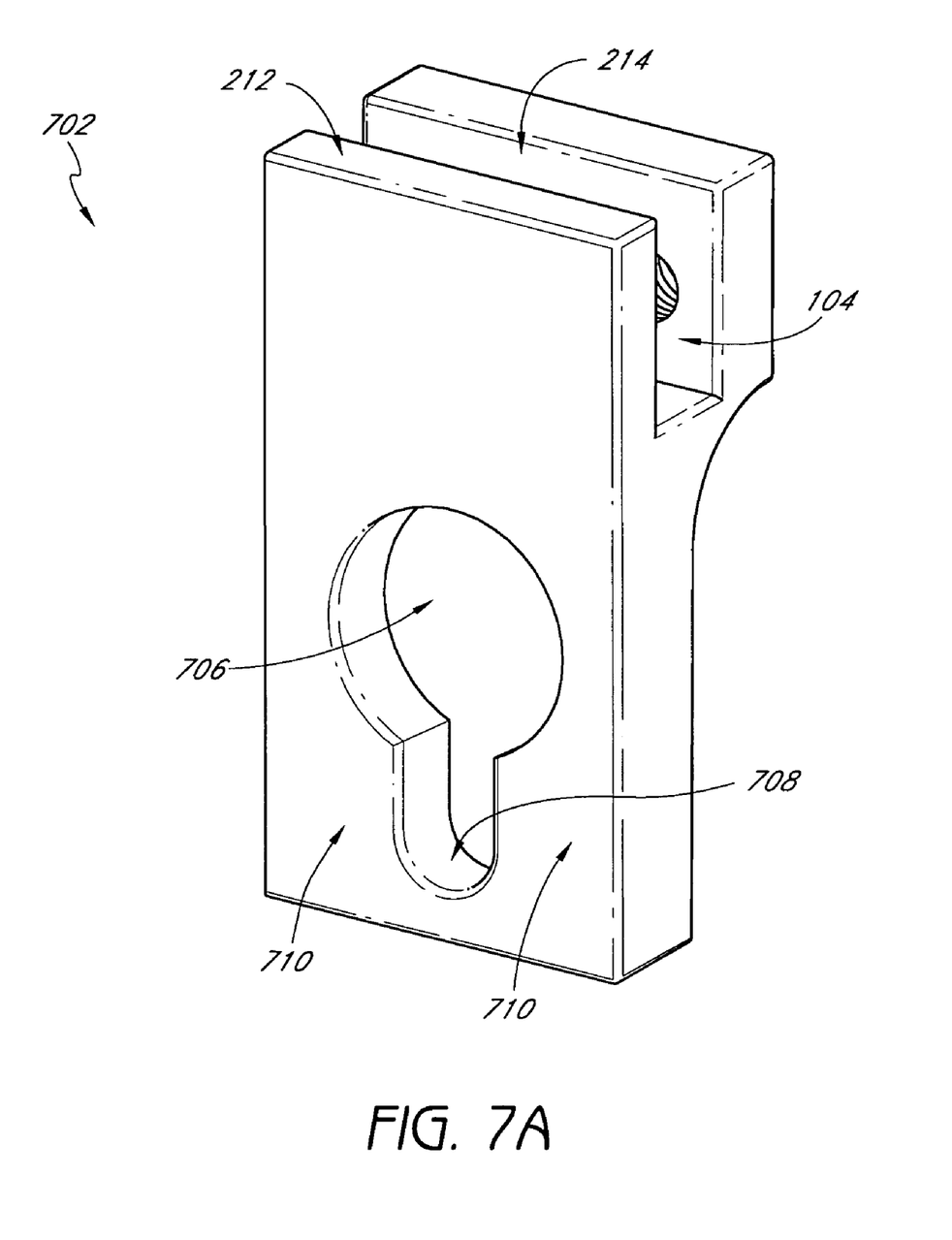
FIG. 7a illustrates a perspective view of an embodiment of a wheel mounting bracket having a circular axle access channel.
Figure 7B:
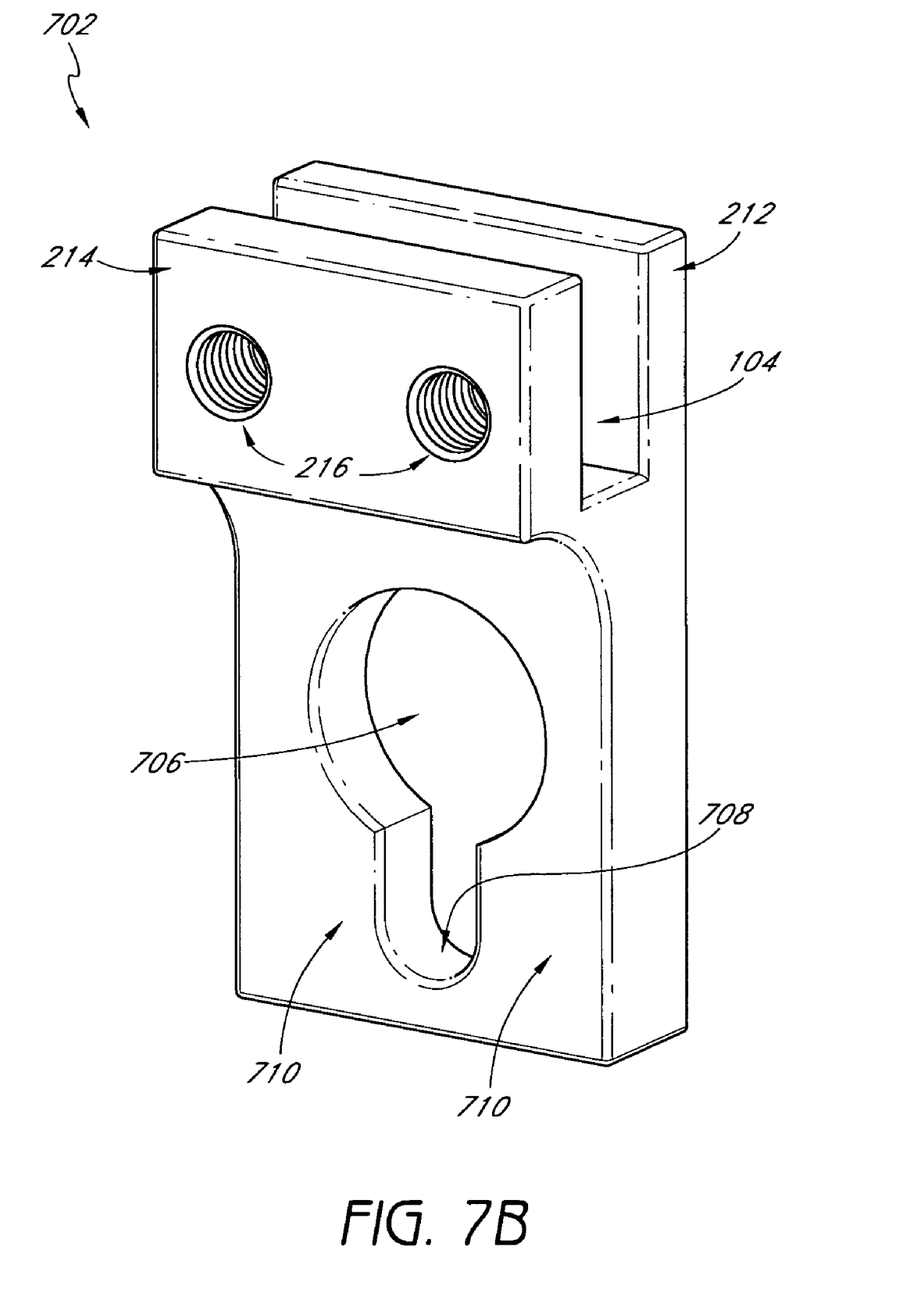

FIGS. 7a and 7b show front and back perspective views of wheel mount 702 including an axle-accepting channel 706 comprising a generally circular opening large enough to accept, for example, end cap 428. In placing the wheel 422, the end cap 428 is slipped through the circular opening of axle-accepting channel 106 and the wheel is then lowered to allow axle 424 to sit at or near a resting position 708. The width of resting position 708 is preferably reduced to allow acceptance of the axle 424 but restrict the end cap 428 from sliding out of the wheel mounting bracket 102 without being lifted. Some wheels may be transported sitting in the resting position 708 while others may utilize the camming lever 426 to tighten the wheel against the clamping surfaces 710.

Figure 8A:
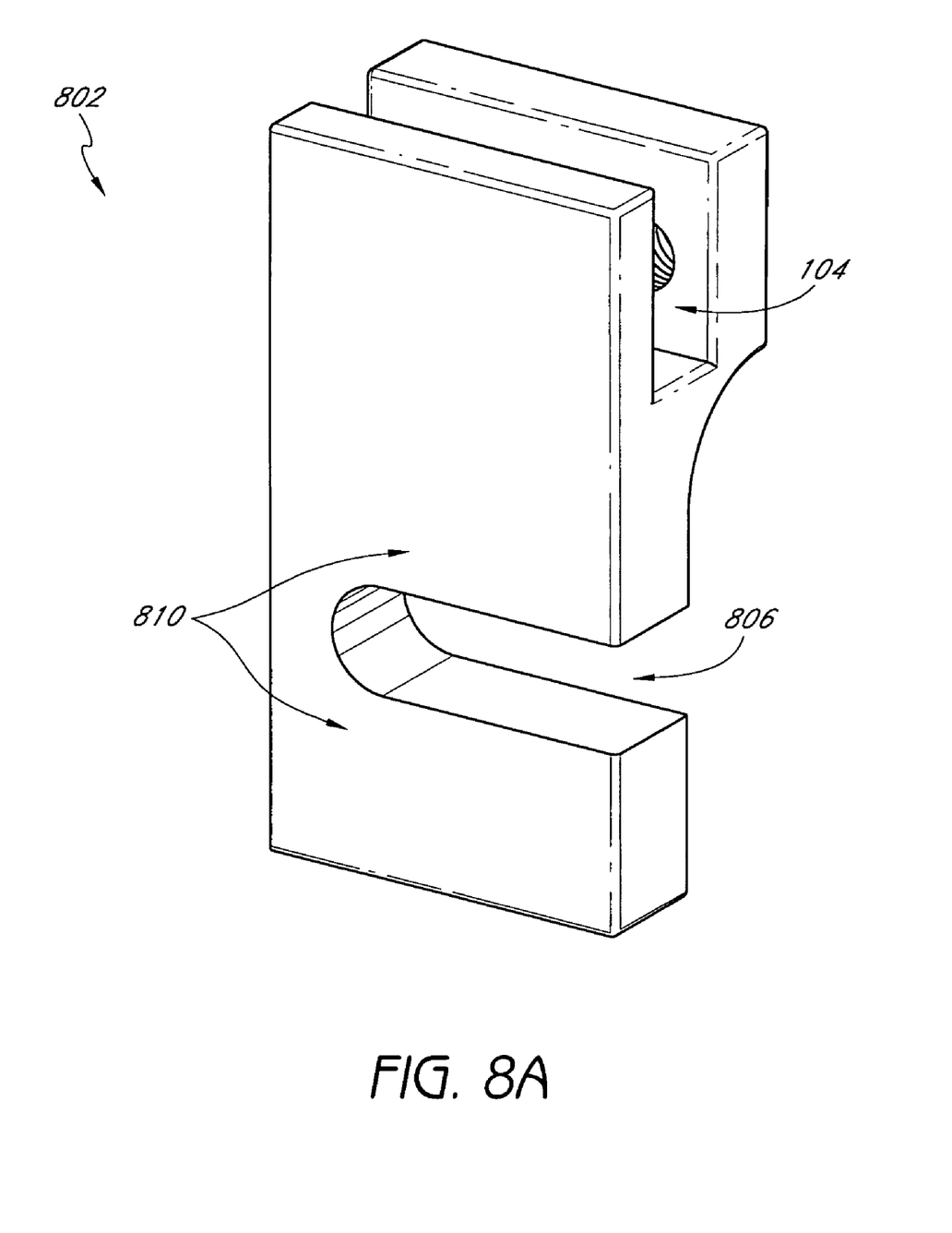
FIG. 8a illustrates a perspective view of another alternative embodiment of the wheel mounting bracket according to the present disclosure.
Figure 8B:
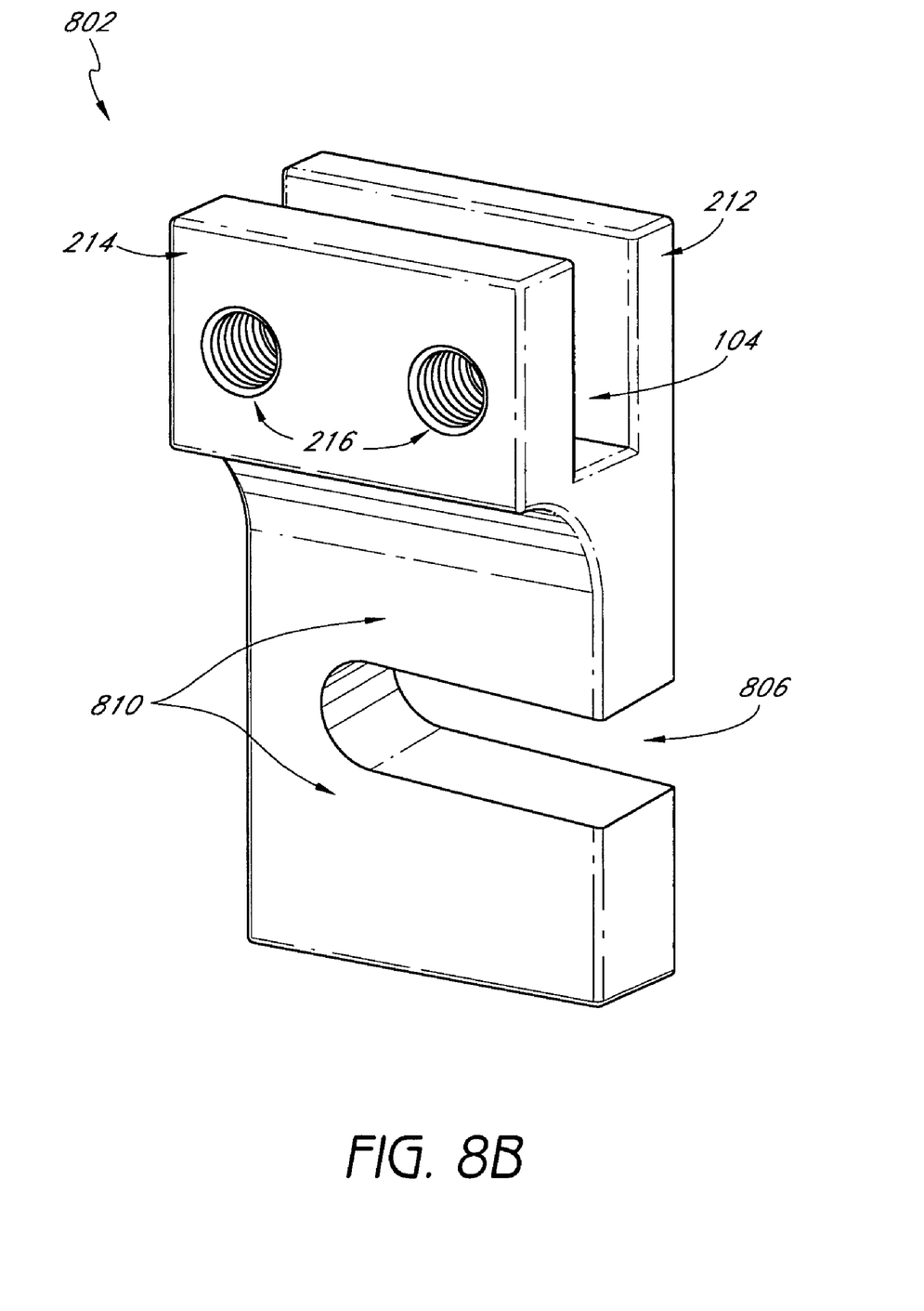
FIG. 8b illustrates a rear perspective view of an alternative embodiment of the wheel mounting bracket similar to that pictured in FIG. 8a, but also illustrating that the axle access channel may have an opening on either side of the mounting bracket.

FIGS. 8a and 8b illustrate a front and rear view respectively of two embodiments of wheel mounting bracket 802 including axle-accepting channel 806 comprising a straight channel. These wheel mounting brackets 802 will be more effective when used in conjunction with a camming mechanism on the wheel 422 to retard horizontal motion of the wheel 422 during transportation. In an embodiment, wheel mounting bracket 802 may be sized such that normal positioning of the mounting bracket 802 in a cargo bed allows a wheel 422 to roll along the cargo bed and the wheel axle 424 to fit into the axle-accepting channel 806 without having to lift the wheel into place. As can be seen, the axle-accepting channel 806 may extend from either side of the mounting bracket 802.

In various additional embodiments, the axle-accepting channel 106 may have any of a number of shapes or orientations and may have an opening on either the left side (as in FIG. 1) or right side (as in FIG. 8a) or neither (as in FIG. 7a, 7b). In general, it is preferred that axle-accepting channel 106 be angled or bent downward, such that at least one point along axle-accepting channel 106 is defined as a resting point 108 by being lower than at least one point along the axle-accepting channel between resting point 108 and the opening to axle-accepting channel 106. In particular, this preference contemplates axle-accepting channels having a downward slope from the opening to a resting point 108; having a single bend—such as the L-shape pictured in FIG. 1; having multiple bends—as in a W-shape; having single curves, such as a quarter circle; having multiple curves as in a general S-shape; and/or having a combination of any of the foregoing. Although it is preferred to also utilize a camming mechanism to hold a wheel in place for transportation, gravitational forces will generally help keep a wheel in position when the wheel is placed at a resting point 108.

Beyond the shape and orientation of axle-accepting channel 106, an artisan will recognize a number of other alternatives for construction and use of a wheel mounting bracket as disclosed herein. As mentioned above, the wheel mounting bracket 102 may be a solid, single piece of material. This may or may not include the attachment member. For example, with the general U-shaped mounting channel 104, as shown in the figures, the channel may be sized to frictionally resist removal from a truck bed rail or other mounting location; at least a portion of the mounting channel 104 may be flexible to accomplish this frictional resistance. The attachment member may also include multiple parts in some embodiments, and may advantageously include multiple coordinating mechanical parts and/or parts to protect the attachment site (e.g. pads).

Suitable materials for a wheel mount according to the present disclosure include: metals, metal alloys, rigid or semi-rigid plastics, rigid or semi-rigid rubbers, wood, and/or naturally occurring or man-made products or combinations thereof. A preference is given for those materials that resist corrosion due to rain, wind, sun or other environmental elements. In some embodiments, the mounting brackets may be carved out of a single block of material, cast in forms, or created from multiple pieces.

While bolts, pegs, and screws were discussed as means for attaching a wheel mounting bracket to a truck bed, other attachment means may be employed. For example, springs and/or flexible or multi-part hinges may be utilized to clasp to a truck rail lip or other attachment location. A single or multiple magnets may also be utilized for attachment. In one embodiment, a magnet attached to the wheel mounting bracket may attract directly to a truck bed railing. In another embodiment, one or more magnets of sufficient strength may be placed opposite the railing lip 420 from either a wheel mounting bracket with an attached magnet or a wheel mounting bracket made of a magnetically sensitive material. In another embodiment, the attachment mechanism may be a cam mechanism. Various removable or permanent adhesives can also be used to attach a mounting bracket to a truck bed. Suction cups may also be used to attach a wheel mounting bracket in some instances. A user may also transport bicycle and other wheels in cars, SUVs, box trucks, and the like, by attaching a wheel mounting bracket in other locations, such as a car trunk lid, the back of an SUV or wagon, a cargo rack (such as a roof rack), and the walls or side rails of a box truck. While the wheel mount 102 has been discussed mainly in relation to transportation of a wheel in a cargo bed or other portion of a vehicle, the wheel mount 102 may also be utilized to store wheels in a garage, shed, or basement, and the like, such as by attaching to a wall, a door, a shelf, utility pegboards, and the like. In an embodiment, the wheel mount may also be used in bicycle shops, sporting goods stores, and the like for storage of and/or to display a wheel.

Although the foregoing has been described in terms of certain preferred embodiments, other embodiments will be apparent to those of ordinary skill in the art from the disclosure herein. Moreover, the described embodiments have been presented by way of example only, and are not intended to limit the scope of the disclosure. Indeed, the novel device described herein may be embodied in a variety of other forms without departing from the spirit thereof. Accordingly, other combinations, omissions, substitutions and modifications will be apparent to the skilled artisan in view of the disclosure herein. Thus, the present disclosure is not limited by the preferred embodiments, but is defined by reference to the appended claims. The accompanying claims and their equivalents are intended to cover forms or modifications as would fall within the scope and spirit of the disclosure.

What is claimed is:

1. A bicycle wheel mount for storage of a bicycle wheel, comprising:
   a bicycle wheel mount portion comprising a side surface including a pair of clamping surfaces defining an engagement slot therebetween, said engagement slot defining an L-shape having an open end and a closed end, wherein said closed end is positioned below said open end when said bicycle wheel mount is installed for use, said engagement slot being capable of accepting a portion of an axle of a bicycle wheel and allowing the axle to be moved from said open end to said closed end of said engagement slot, said pair of clamping surfaces configured to contact a hub portion of the wheel when the axle is positioned at said closed end of said engagement slot; and
   an attachment portion, wherein said wheel mount portion and said attachment portion are formed from a single piece of material, wherein said wheel mount portion extends below said attachment portion, said attachment portion comprising an upwardly-facing, generally U-shaped mounting channel, said mounting channel comprising an inner portion and an outer portion with respective inner side surfaces thereof defining a space therebetween, said space sized and shaped to accept a railing of a vehicle cargo bed, wherein said clamping surfaces and said inner side surfaces of the U-shaped mounting channel are all parallel to one another and wherein said L-shaped engagement slot is positioned entirely below said space defined by said U-shaped mounting channel and said open end of said engagement slot is below a lowermost surface of said U-shaped mounting channel; and
   at least one fastener engaged with said inner portion, said at least one fastener adjustable relative to said inner portion such that a portion of said at least one fastener can be extended into said space defined between said inner portion and said outer portion and can be fixed at multiple distances relative to the outer portion so that a portion of the railing of the vehicle cargo bed can be engaged between the at least one fastener and said outer portion of said mounting channel to secure said wheel mount to the railing.

2. The wheel mount of claim 1, wherein said wheel mount is positioned on only one side of a wheel when one side of an axle of the wheel is engaged within said engagement slot of said wheel mount portion and the other side of the axle of the wheel is unsupported.

3. The wheel mount of claim 1, wherein said at least one fastener comprises a bolt engaged with a threaded opening in said inner portion of said attachment portion.

4. The wheel mount of claim 1, wherein said at least one fastener comprises a pair of bolts, each one of said pair of bolts engaged with a corresponding one of a pair of spaced-apart threaded openings in said inner portion of said attachment portion.

5. The wheel mount of claim 1, wherein an outer surface of said wheel mount portion is coplanar with an outer surface of said attachment portion.

6. The wheel mount of claim 1, comprising a chamfered surface above and below said open end of said engagement slot on an outer surface side of said wheel mount.

7. An assembly, comprising:
   a bicycle wheel mounting bracket, comprising:
      a mount portion comprising an upwardly-facing, generally U-shaped mounting channel, the mounting channel comprising an inner wall portion, an outer wall portion and a bottom wall portion, wherein respective inwardly-facing side surfaces of the inner and outer wall portions define a vertically-extending space therebetween, one of the inner wall portion and outer wall portion supports at least one fastener that is adjustable relative to the one of the inner wall portion and outer wall portion such that a portion of the at least one fastener can extend into the space between the inner and outer wall portions and be fixed at a desired location within the space to allow the bicycle wheel mounting bracket to be secured to a vertically-oriented, thin, planar support structure; and
      a wheel support portion that is formed along with the mount portion by a single piece of material, the wheel support portion comprising a wall portion having a first side surface and a second side surface opposite the first side surface, wherein the first side surface and the second side surface are parallel to the inwardly-facing side surfaces of the inner and outer wall portions of the mount portion, the wall portion of the wheel support portion defining a slot that extends from the first side surface to the second side surface and has an open end and a closed end, wherein portions of the first side surface and the second side surface adjacent the closed end located below the open end of the slot define clamping surfaces of the wheel support portion;

wherein the wheel support portion extends below the mount portion such that an entirety of the slot is positioned below a lowermost portion of the space between the inner and outer wall portions of the mount portion, and wherein the open end of the slot is below a lowermost surface of the bottom wall portion of the mount portion; and a bicycle wheel comprising a hub that is supported by, and rotatable relative to, an axle of the bicycle wheel, the bicycle wheel further comprising a clamping mechanism that is adjustable relative to the axle and configured to secure the bicycle wheel to a bicycle frame, wherein the one side of the axle is insertable into the open end of the slot and is movable to the closed end of the slot, and wherein the clamping mechanism can be adjusted such that a portion of the clamping mechanism and the hub contact the respective clamping surfaces of the first side surface and second side surface of the wheel support portion to secure the bicycle wheel to the bicycle wheel mounting bracket and support the bicycle wheel on only one side of the bicycle wheel.

8. The assembly of claim 7, wherein the at least one fastener comprises a bolt engaged with a threaded opening in the inner wall portion of the mount portion.

9. The assembly of claim 7, wherein the at least one fastener comprises a pair of bolts, each one of the pair of bolts engaged with a corresponding one of a pair of spaced-apart threaded openings in the inner wall portion of the mount portion.

10. The assembly of claim 7, wherein the second side surface of the wheel support portion is coplanar with an outer surface of the outer wall portion of the mount portion.

11. The assembly of claim 7, comprising a chamfered surface above and below the open end of the slot on the second side surface side of the wheel support portion.

12. The assembly of claim 7, wherein the closed end of the slot is positioned below the open end of the slot.

13. The assembly of claim 12, wherein the slot is L-shaped.

14. The assembly of claim 7, wherein the respective clamping surfaces of the first side surface and the second side surface of the wheel support portion are planar.

\* \* \* \* \*